United States Patent [19]

Elger et al.

[11] 4,362,557
[45] Dec. 7, 1982

[54] PURIFYING TITANIUM-BEARING SLAG BY PROMOTED SULFATION

[75] Inventors: Gerald W. Elger; Ruth A. Holmes, both of Albany, Oreg.

[73] Assignee: The United States of America as represented by the Secretary of the Interior, Washington, D.C.

[21] Appl. No.: 258,075

[22] Filed: Apr. 27, 1981

[51] Int. Cl.³ .............................................. C22B 7/04
[52] U.S. Cl. .......................................... 75/24; 75/116; 423/84
[58] Field of Search ................. 75/1 T, 115, 116, 110, 75/24; 423/84, 45, 551

[56] References Cited

U.S. PATENT DOCUMENTS 1,791,534 7/1929 Coolbaugh ............................ 423/45
2,719,082 9/1955 Sproule ................................. 75/116
3,944,650 3/1976 Hirota .................................. 423/551
4,120,694 10/1978 Elger .................................... 75/1 T

FOREIGN PATENT DOCUMENTS 22746 9/1929 Australia ............................... 75/116
12155 4/1933 Australia ............................... 75/116

Primary Examiner—Brian E. Hearn
Attorney, Agent, or Firm—William S. Brown; Donald A. Gardiner

[57] ABSTRACT

Oxide impurites are removed from the titania slag by: (1) admixing the slag with an alkali metal carbonate, sulfate or chloride, (2) reacting the admixture with $SO_3$ or mixed $SO_2$—$O_2$ gases at elevated temperature to form sulfates of the impurities and (3) leaching the sulfates from the reaction product with water.

3 Claims, No Drawings

PURIFYING TITANIUM-BEARING SLAG BY PROMOTED SULFATION

This invention relates to a process for removing metal oxide, particularly alkaline earth oxide, impurities from titania slag, whereby the slag is made suitable for chlorination to form titanium tetrachloride. The process of the present invention is an improvement over that disclosed and claimed in U.S. Pat. No. 4,120,694, the disclosure of which is hereby incorporated by reference. This patent discloses removal of such impurities by treatment of titania slag with $SO_3$ gas at elevated temperatures, whereby alkaline earth oxides are converted to sulfates which can be removed by leaching with water.

According to the process of the present invention, the efficiency of the process of U.S. Pat. No. 4,120,694 is substantially improved by addition of a promotor to the titania slag prior to treatment with $SO_3$. The promoter consists of an alkali metal carbonate, sulfate or chloride. For reasons of economy and efficiency, the sodium salts, i.e., $Na_2CO_3$, $Na_2SO_4$ or NaCl, are generally preferred. In addition, it has been found that a mixture of $SO_2$ and $O_2$ gases may be employed in place of the $SO_3$.

Both the titania slag and the promoter are employed in finely divided form, e.g., about 35 to 65 mesh, and the two are thoroughly admixed by conventional means prior to reaction with $SO_3$ or mixed $SO_2$—$O_2$ gases. The promoter is employed in an amount sufficient to constitute about 5 to 25 weight percent of the admixture.

As in the procedure of U.S. Pat. No. 4,120,694, the $SO_3$ may be employed alone, or in admixture with oxygen to convert any titanium oxides to the titanium dioxide state. The preferred temperature range for the reaction is about 700° to 1100° C. Concentrations and flow rates of the $SO_3$, or $SO_2$—$O_2$ mixture, and $O_2$ are also similar to those of the patent, with reaction times sufficient to optimize conversion of alkaline earth oxides to sulfates.

It may also be desirable in some instances to agglomerate the admixture of slag and promoter prior to reaction with $SO_3$ or mixed $SO_2$—$O_2$ gases in order to minimize dust formation. Pellets of suitable size, e.g., about 3 to 12 mm, are readily prepared by use of a conventional binder, such as powdered sugar or bentonite, and a suitable amount of water. The pellets are then dried, e.g., at a temperature of about 120° C., prior to $SO_3$ or mixed $SO_2$—$O_2$ treatment.

Alternatively, the blend of slag and promoter may be sintered, e.g., at about 1200° C., and the sintered product cooled and reground to a particle size of about 65-mesh prior to admixture with binder and subsequent pelletizing. Also, the sintered and reground admixture may be compacted into disks for treatment with $SO_3$ or $SO_2$—$O_2$.

Removal of the alkaline earth sulfates, formed by the reaction with $SO_3$ or mixed $SO_2$—$O_2$ gases, from the reaction mixture is readily accomplished by water or dilute hydrochloric acid leaching at room temperature. This results in removal of about 80 percent or more of the oxides of Mg and Ca, as well as Mn, and provides a product that responds successfully to chlorination in a fluidized-bed reactor. Dilute hydrochloric acid leaching (about 1 wt-pct HCl concentration) is preferred over water alone for removal of the sulfated impurities because calcium sulfate is less soluble in water. Use of hydrochloric acid solution in place of water results in about 50 percent reduction in volume of leach solution required.

The process of the invention, and the resultant improvements in purification of titania slag, will be more specifically illustrated by the following examples.

EXAMPLE 1

A sample of a titaniferous concentrate from a low-grade, rock-type deposit in Rhode Island was carbothermically reduced in an electric-arc furnace to separate most of the iron as a pig iron fraction and leave a titanium-enriched slag. The titania slag had the following composition:

| Constituents | Wt-pct |
|---|---|
| $TiO_2$ | 54.8 |
| FeO | 2.2 |
| $SiO_2$ | 16.1 |
| MgO | 8.8 |
| CaO | 8.2 |
| MnO | 0.5 |
| $Al_2O_3$ | 8.8 |
| Other (including $V_2O_5$, $Cr_2O_3$, and C) | 0.6 |
| | 100.0 |

A 2.64 kg sample of the slag (ground to pass through a 65-mesh sieve) was blended with 10 wt-pct sodium sulfate and 2 wt-pct powdered sugar. The blended constituents were agglomerated on a rotating disk pelletizer, using sufficient water to form 6 to 10 mm diameter pellets. The slag pellets were dried at 120° C. and were divided into three charges of equal weight for sulfation treatment. The reactor utilized for treating the slag pellets was a vertical tube furnace with an ID of 5.1 cm and a height of 121.9 cm. Each charge of pellets was contacted with a mixture of $SO_3$ and $O_2$, the $SO_3$ being formed by passing a flow of $SO_2$ and $O_2$ over a catalyst in a three-stage unit heated to 400° C.

The slag pellets were placed in a static bed and were treated at 700° C. for 7 hours, using a $SO_3$ flow of 300 cc/min and an $O_2$ flow of 100 cc/min. The pretreated slag pellets were cooled under a static $SO_2$ atmosphere to minimize the decomposition of the sulfated impurities. To remove the sulfated impurities, the treated pellets were ground to pass through a 48-mesh sieve, and the ground slag was leached with water at ambient temperature for 3 hours. A slag-to-water ratio of 20-to-1 was utilized in the leaching step. After leaching, the slag was filtered and then dried at 120° C. before sampling for chemical analyses.

Analytical data indicated that 29.8 pct of the FeO, 84.6 pct of the MgO, 78.9 pct of the CaO and 84 pct of the MnO impurities were removed from the water-leached slag sample. The pretreated slag contained in wt-pct: 66 $TiO_2$, 1.9 FeO, 0.8 MgO, 0.3 CaO and 0.1 MnO, besides other oxide constituents. Subsequent chlorination of the pretreated slag was achieved without difficulty in a 6½ hour run made in a 5.1 cm diameter fluidized bed reactor at 1050° C. About 94.5 pct of the titanium in the feed stock was extracted as titanium tetrachloride. Without pretreatment, the slag sample was not amenable to direct chlorination because the troublesome impurities in the feed stock formed liquid chlorides and plugged the reactor after operating for only 45 minutes.

EXAMPLE 2

Two 950-gram samples of untreated ground slag made from an ilmenite concentrate from a titaniferous rock mine in New York state were blended with either 8 or 16 wt-pct additions of sodium carbonate. The blended charges, placed in fireclay crucibles, were heated in a muffle furnace to a maximum temperature of 1200° C., and maintained at temperature for one hour. The crucibles were removed from the furnace and the sintered products were cooled in air before they were reground to pass through a 65-mesh sieve.

Next, 25-gram charges of the ground products were mixed with 2 wt-pct powdered sugar and the blended constituents were compacted into disks. The slag disks were pretreated with a mixture of $SO_3$ and $O_2$ gases at temperatures of 700°, 800°, 900° and 1000° C. for 2 or 4 hours. The pretreated slag disks were reground to pass through a 65-mesh screen and samples of the ground material were water leached. Following filtration, the leached samples were dried and then chemically analyzed for impurity contents. The best results were achieved with a slag sample pretreated in the presence of 8 wt-pct sodium carbonate at 800° C. for 4 hours. Under these conditions 90.5 pct of the MgO and 69.5 pct of the CaO were removed from the slag sample. Reducing the treatment time to 2 hours lowered the MgO removal to 86.9 pct, but increased the CaO removal to 74.4 pct.

EXAMPLE 3

Twenty-five gram samples of the ground untreated slag described in Example 2 were blended with either 5 or 10 wt-pct additions of sodium chloride and 2 wt-pct powdered sugar. Also, a slag charge containing no additives and blended with 2 wt-pct sugar was prepared for comparison with those containing sodium chloride additive. The slag charges were agglomerated to form pellets of 3.2 to 6.4 mm diameter. The pelletized charges were dried, contacted with a mixed flow of $SO_3$ and $O_2$ gases at 700° or 800° C. for 4 hours, and then cooled under a static $SO_2$ atmosphere to minimize decomposition of the sulfated impurities back to their oxide forms. The pretreated pellets were ground to pass through a 65-mesh screen and the ground samples were water leached. The leached slag samples were filtered, dried, and then chemically analyzed for CaO, MgO, and $Na_2O$ contents. Up to 77.6 pct of the MgO and 63.0 pct of the CaO were removed from slag sample which contained 10 wt-pct additions of sodium chloride and which were pretreated at 800° C. Only 45.1 pct of the MgO and 46.9 pct of the CaO were removed from a slag sample pretreated under similar operating conditions without any sodium chloride additive.

EXAMPLE 4

Fifty-gram charges of a ground titania slag were blended with either 14 or 20 wt-pct $Na_2SO_4$ and 2 wt-pct sugar binder. The blended charge were formed into 3.2 mm diameter (⅛ inch) pellets by moistening with water while tumbling on a rotating disk pelletizer. The pellets were dried, contacted with a mixed flow of $SO_2$ and $O_2$ gases at 800° C. or 900° C. for 2, 4, or 6 hours, as shown in the attached table. Gas flows of 100 cc per minute each of $SO_2$ and $O_2$ were used. The treated slag samples were cooled according to the procedure used in Example 2. The samples were ground to pass through a 65-mesh screen, and 5-gram portions of each ground sample were leached in 1 wt-pct HCl solution at ambient temperature for 1 hour. The leached slag products were filtered, dried, and samples of each were analyzed for MgO, CaO, and MnO contents. The effects of operating conditions on the removal of impurities from the slag samples are summarized in the following table.

| Sample | Composition, wt-pct | | | | Impurity removal, pct | | |
|---|---|---|---|---|---|---|---|
| | $TiO_2$ | MgO | CaO | MnO | MgO | CaO | MnO |
| Head slag before treatment | 75.7 | 5.9 | 3.8 | 0.9 | | | |
| Treated slag, sulfation conditions | | | | | | | |
| 1. At 900° C. for 2 hr, 14 wt-pct $Na_2SO_4$ addition | NA | 1.6 | .1 | .2 | 73.1 | 97.1 | 85.4 |
| 2. At 900° C. for 6 hr, 14 wt-pct $Na_2SO_4$ addition | | 1.2 | .3 | .1 | 83.0 | 94.4 | 93.5 |
| 3. At 800° C. for 6 hr, 14 wt-pct $Na_2SO_4$ addition | | 1.2 | .2 | .1 | 80.3 | 90.0 | 91.7 |
| 4. At 900° C. for 2 hr, 20 wt-pct $Na_2SO_4$ addition | | 1.0 | .2 | .1 | 83.1 | 93.9 | 93.0 |
| 5. At 900° C. for 4 hr, 20 wt-pct $Na_2SO_4$ addition | | 0.7 | .1 | .1 | 90.4 | 97.5 | 95.3 |
| 6. At 900° C. for 6 hr, 20 wt-pct $Na_2SO_4$ addition | | 1.0 | .2 | .05 | 85.6 | 96.0 | 95.0 |

We claim:

1. A process for removing alkaline earth oxide impurities from a titania slag comprising:
   admixing the slag with a promoter consisting essentially of sodium carbonate,
   reacting the admixture with sulfur trioxide gas or a mixture of sulfur dioxide and oxygen gases at a temperature of about 700° to 1100° C. to form a reaction product containing alkaline earth sulfates, and
   leaching the alkaline earth sulfates from the reaction product with water.

2. The process of claim 1 in which the promoter comprises about 5 to 25 percent by weight of the admixture of slag and promoter.

3. The process of claim 1 in which the admixture of slag and promoter is reacted with a mixture of $SO_3$ and $O_2$.

* * * * *